US012561043B2

(12) United States Patent
Cho et al.

(10) Patent No.: US 12,561,043 B2
(45) Date of Patent: Feb. 24, 2026

(54) METHOD AND DEVICE FOR DISPLAYING GRAPHIC OBJECT

(71) Applicant: SAMSUNG ELECTRONICS CO., LTD., Suwon-si (KR)

(72) Inventors: Hyungrae Cho, Suwon-si (KR); Bonheon Koo, Suwon-si (KR); Jongtae Kim, Suwon-si (KR); Yoomi Noh, Suwon-si (KR); Hongjin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/377,189

(22) Filed: Oct. 5, 2023

(65) Prior Publication Data

US 2024/0045565 A1 Feb. 8, 2024

Related U.S. Application Data

(63) Continuation of application No. PCT/KR2022/003823, filed on Mar. 18, 2022.

(30) Foreign Application Priority Data

May 13, 2021 (KR) ........................ 10-2021-0061888

(51) Int. Cl.
*G16Y 40/10* (2020.01)
*G06F 3/04817* (2022.01)
*G06F 3/04855* (2022.01)

(52) U.S. Cl.
CPC ...... *G06F 3/04817* (2013.01); *G06F 3/04855* (2013.01); *G16Y 40/10* (2020.01)

(58) Field of Classification Search
CPC .. G06F 3/04817; G06F 3/04855; G16Y 40/10
(Continued)

(56) References Cited

U.S. PATENT DOCUMENTS 9,571,625 B2 2/2017 Kim et al.
10,846,324 B2 11/2020 Zhang et al.
(Continued)

FOREIGN PATENT DOCUMENTS

JP 2005-72839 A 3/2005
JP 2015-69391 A 4/2015
(Continued)

OTHER PUBLICATIONS

Communication issued Jun. 20, 2024 by the European Patent Office in European Patent Application No. 22807601.4.
(Continued)

*Primary Examiner* — Glenford J Madamba
(74) *Attorney, Agent, or Firm* — Sughrue Mion, PLLC

(57) ABSTRACT

An electronic device includes a display, a communicator that establishes a connection to at least one Internet of Things (IoT) device, and a processor configured to receive information on an event from the at least one IoT device in response to detecting the event occurring in the at least one IoT device, update a graphic object for a category based on a merge between the detected event and another event according to a priority of each event in response to classifying the detected event into the category in which the other event previously occurring is pending among preset categories, and display the graphic object for the classified category on the display based on a graphic object for another category and a priority of each category.

20 Claims, 15 Drawing Sheets

(58) Field of Classification Search
USPC ......................................................... 709/224
See application file for complete search history.

(56) References Cited

U.S. PATENT DOCUMENTS

| | | | |
|---|---|---|---|
| 2016/0057029 A1 | 2/2016 | Iida et al. | |
| 2020/0177485 A1* | 6/2020 | Shurtleff | .............. H04L 63/101 |

FOREIGN PATENT DOCUMENTS

| | | | |
|---|---|---|---|
| KR | 10-2015-0028191 A | 3/2015 | |
| KR | 10-2015-0074765 A | 7/2015 | |
| KR | 10-1770240 B1 | 8/2017 | |
| KR | 10-2018-0137913 A | 12/2018 | |
| WO | WO-2016187298 A1 * | 11/2016 | ........... G06T 19/003 |

OTHER PUBLICATIONS

Communication issued Sep. 16, 2025 by the Korean Intellectual Property Office in counterpart Korean Patent Application No. 10-2021-0061888.

* cited by examiner

1300

Communicator 1310

Display 1320

Processor 1330

Memory 1340

METHOD AND DEVICE FOR DISPLAYING GRAPHIC OBJECT

CROSS-REFERENCE TO RELATED APPLICATIONS

This application is a by-pass continuation of International Application No. PCT/KR2022/003823, filed on Mar. 18, 2022, which is based on and claims priority to Korean Patent Application No. 10-2021-0061888, filed on May 13, 2021, in the Korean Intellectual Property Office, the disclosures of which are incorporated by reference herein in their entireties.

BACKGROUND

1. Field

The disclosure relates to a method of displaying a graphic object.

2. Description of Related Art

The continuous development of electrical and electronic communication technologies has enabled the practical use of the Internet of Things (IoT) technology for sharing information obtained from things through internet communication, and accordingly, IoT solutions have been gradually expanded, for example, for a refrigerator, a boiler, a gas stove, or other appliances used in a general household. An electronic device may provide information on an event when detecting the event occurring in IoT devices. For example, the electronic device may obtain information on temperature, humidity, whether a door is open, or whether a light bulb is turned on from the IoT devices connected to the electronic device and display the information on a display. Although a typical electronic device provides information on events detected from an IoT device through a graphic object, the information is generally provided according to an event detection order without considering the importance or urgency of the events.

SUMMARY

According to an aspect of the disclosure, an electronic device includes: a display; a communicator configured to establish a connection to at least one Internet of Things (IoT) device; and at least one processor configured to: receive information on an event detected by the at least one IoT device, classifying the detected event into a first category from among a plurality of preset categories, based on identifying that the detected event is among a plurality of pending events in the first category, update a graphic object associated with the first category based on a merge between the detected event and the other pending events of the plurality of pending events in the first category according to a priority of each pending event in the plurality of pending events in the first category, and display the updated graphic object associated with the first category on the display based on a graphic object associated with a category of the plurality of preset categories other than the first category and a priority of each category of the plurality of preset categories.

The at least one processor may be further configured to: based on identifying that the detected event is the only pending event in the first category, generate a new graphic object associated with the first category using the received information on the detected event and display the new graphic object associated with the first category on the display based on a graphic object associated with a category of the plurality of preset categories other than the first category and the priority of each category of the plurality of preset categories.

The at least one processor may be further configured to: update the graphic object associated with the first category to reflect a pending event among the plurality of pending events in the first category having the highest priority and a number of the plurality of pending events in the first category.

The at least one processor may be further configured to: based on a user interacting with the graphic object associated with the first category, provide the user with information on the plurality of pending events in the first category according to the priority of each pending event among the plurality of pending events in the first category.

Each respective category of the plurality of preset categories may be associated with a different basis for prioritizing pending events within the respective category.

The plurality of preset categories may include a first category, a second category, and a third category, the first category pending events may be prioritized based on an event remaining time, the second category pending events may be prioritized based on an event occurrence target, and the third category pending events may be prioritized based on an event occurrence order.

Among the plurality of preset categories, the priority of each preset category of the plurality of preset categories may be set according to a function corresponding to each of the preset categories of the plurality of preset categories, and the at least one processor may be further configured to classify the detected event into first category based on a function indicated by the detected event.

The at least one processor may be further configured to: display, on the display, a first graphic object associated with a second category among the plurality of preset categories having a priority that is higher than the priority of the first category on a first side, and display, on the display, the updated graphic object associated with the first category on a second side that is opposite to the first side relative to a center of the display.

The at least one processor may be further configured to: scroll graphic objects to display the first graphic object on the first side when the first graphic object is not displayed on the first side.

The at least one processor may be further configured to: display, on the display, a second graphic object associated with a third category among the plurality of preset categories having a priority that is lower than the priority of the first category on a second side, and display, on the display, the updated graphic object associated with the first category on a first side that is opposite to the second side relative to a center of the display.

The at least one processor may be further configured to: display a scroll bar on the display configured to allow a user to search for graphic objects associated with categories among the plurality of preset categories for less than or equal to a threshold time, and end the display of the scroll bar when the threshold time elapses and the updated graphic object associated with the first category is displayed on the display.

The at least one processor may be further configured to: repeat an operation of moving all graphic objects associated with categories among the plurality of preset categories displayed on the display closer to an edge of the display and moving all graphic objects associated with categories among the plurality of preset categories farther from the edge of the display for a predetermined number of times based on an edge of the display adjacent to a position of the updated graphic object associated with the first category on the display.

The at least one processor may be further configured to: increase a size of the updated graphic object associated with the first category from a size that is less than a size of a graphic object associated with another category among the plurality of preset categories to a size that is equal to the size of the graphic object associated with the other category among the plurality of preset categories.

The at least one processor may be further configured to: receive information on a second event detected by the at least one IoT device, classify the second detected event into a second category from among the plurality of preset categories, and delete or update a graphic object associated with the second category.

According to an aspect of the disclosure, a method performed by an electronic device includes: receiving information on an event detected by at least one Internet of Things device; classifying the detected event into a first category from among a plurality of preset categories; based on identifying that the detected event is among a plurality of pending events in the first category, updating a graphic object associated with the first category based on a merge between the detected event and the other pending events of the plurality of pending events in the first category according to a priority of each pending event in the plurality of pending events in the first category; and displaying the updated graphic object associated with the first category on a display based on a graphic object associated with a category among the plurality of preset categories other than the first category and a priority of each category of the plurality of preset categories.

The method may further include: based on identifying that the detected event is the only pending event in the first category, generating a new graphic object associated with the first category using the received information on the detected event and displaying the new graphic object associated with the first category on the display based on a graphic object for a category among the plurality of preset categories other than the first category and the priority of each category of the plurality of preset categories.

The displaying on the display may include: displaying, on the display, a first graphic object for a second category among the plurality of preset categories having a priority that is higher than the priority of the first category on a first side; and displaying the graphic object for the classified category on a second side that is opposite to the first side based on a center of the display.

The displaying on the display may further include: scrolling graphic objects to display the first graphic object on the first side when the first graphic object is not displayed on the first side.

The displaying on the display may further include: displaying, on the display, a second graphic object for a third category among the plurality of preset categories having a priority that is lower than the priority of the first category on a second side; and displaying, on the display, the updated graphic object for the first category on a first side that is opposite to the second side relative to a center of the display.

According to an aspect of the disclosure, a non-transitory computer readable medium having instructions stored therein, which when executed by at least one processor cause the at least one processor to execute a method of operating an electronic device including: receiving information on an event detected by the at least one Internet of Things device; classifying the detected event into a first category from among a plurality of preset categories; based on identifying that the detected event is among a plurality of pending events in the first category, updating a graphic object associated with the first category based on a merge between the detected event and the other pending events of the plurality of pending events in the first category according to a priority of each pending event in the plurality of pending events in the first category; and displaying the updated graphic object associated with the first category on a display based on a graphic object associated with a category among the plurality of preset categories other than the first category and a priority of each category of the plurality of preset categories.

According to an aspect of the disclosure, an electronic device includes: a display; a communicator configured to establish a connection to at least one Internet of Things (IoT) device; and at least one processor configured to: receive information from the at least one IoT device on an event detected by the at least one IoT device, classifying the detected event into a first category from among a plurality of preset categories, based on identifying that the detected event is among a plurality of pending events in the first category, update a graphic object associated with the first category based on a merge between the detected event and the other pending events of the plurality of pending events in the first category according to a priority of each pending event in the plurality of pending events in the first category, based on identifying that the detected event is the only pending event in the first category, generate a new graphic object associated with the first category using the received information on the detected event, and display either the updated graphic object or the new graphic object on the display based on a graphic object associated with a category of the plurality of preset categories other than the first category and a priority of each category of the plurality of preset categories.

According to an embodiment, an electronic device may merge events pending in a category according to a priority of each event in the category and display graphic objects for categories on a display based on a priority of each category. Accordingly, the electronic device may provide information on the events in a descending order from the highest priority, and thus, may help a user to intuitively recognize an event of high importance or urgency.

In addition, the electronic device may display a graphic object for a category into which an event is classified when detecting the event that newly occurs. The electronic device may move a focus, on the display, to the graphic object for the category into which the detected event is classified and may prevent the user from missing information even when the priority of the event is low.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
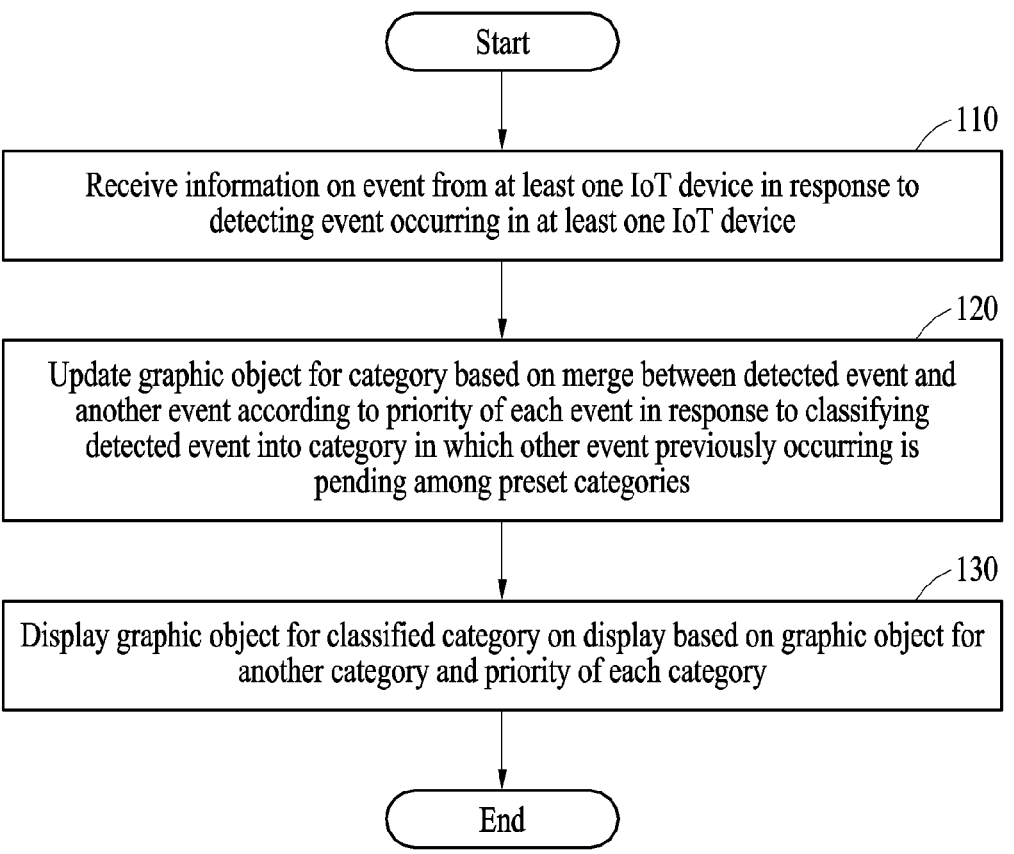
FIGS. 1 and 2 are flowcharts illustrating an operation of an electronic device according to an embodiment.

The following detailed structural or functional description is provided as an example only and various alterations and modifications may be made to embodiments. Here, examples are not construed as limited to the disclosure and should be understood to include all changes, equivalents, and replacements within the idea and the technical scope of the disclosure.

Terms such as first, second, and the like may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Herein, the expression "at least one of a, b or c" indicates "only a," "only b," "only c," "both a and b," "both a and c," "both b and c," or "all of a, b, and c."

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a flowchart illustrating an operation of an electronic device according to an embodiment.

In operation 110, the electronic device may receive information on an event from at least one Internet of Things (IoT) device in response to detecting the event occurring in the at least one IoT device. According to an embodiment, a communicator of the electronic device may establish a connection to the at least one IoT device. The electronic device may additionally receive information, for example, on a position of occurrence of the event, a remaining time of an operation of the event, a target of occurrence of the event, or the like, as the information on the detected event from the at least one IoT device.

In operation 120, the electronic device may update a graphic object for a category based on a merge between the detected event and another event according to a priority of each event in response to classifying the detected event into the category in which the other event previously occurring is pending among preset categories.

The priority of each event may be set for each category. For example, one category may merge events by using a priority according to a remaining time of the events, another category may merge the events by using a priority according to a target of occurrence of the events, and yet another category may merge the events by using a priority according to an order of occurrence of the events.

According to an embodiment, the electronic device may generate each graphic object for each category. The electronic device may classify each of the events pending in the electronic device into one category of the preset categories and may generate a graphic object for a category in which at least one event is pending. Likewise, when detecting an event that newly occurs, the electronic device may classify the detected event into one category of the preset categories. With respect to the category into which the detected event is classified, the electronic device may merge all events, including the detected event, which are pending in the category according to a priority of each event and update a graphic object for the category.

In operation 130, the electronic device may display the graphic object for the classified category on a display based on a graphic object for another category and a priority of each category.

According to an embodiment, the electronic device may provide a user with information on an event when detecting the event that newly occurs. According to an embodiment, the electronic device may provide the user with information on the event through a graphic object. According to an embodiment, the electronic device may directly display the graphic object for a category into which the detected event is classified when detecting the newly occurring event. Even when displaying graphic objects for other categories on the display, the electronic device may scroll the graphic objects to display the graphic object for the category into which the detected event is classified when detecting the newly occurring event. The electronic device may display, on the display, the graphic object for the category into which the detected event is classified, based on a priority of each category. The priority of each category may be set, for example, according to a function corresponding to a category. The detailed method of the electronic device displaying, on the display, the graphic object for the category into which the detected event is classified is described below.

Figure 2:
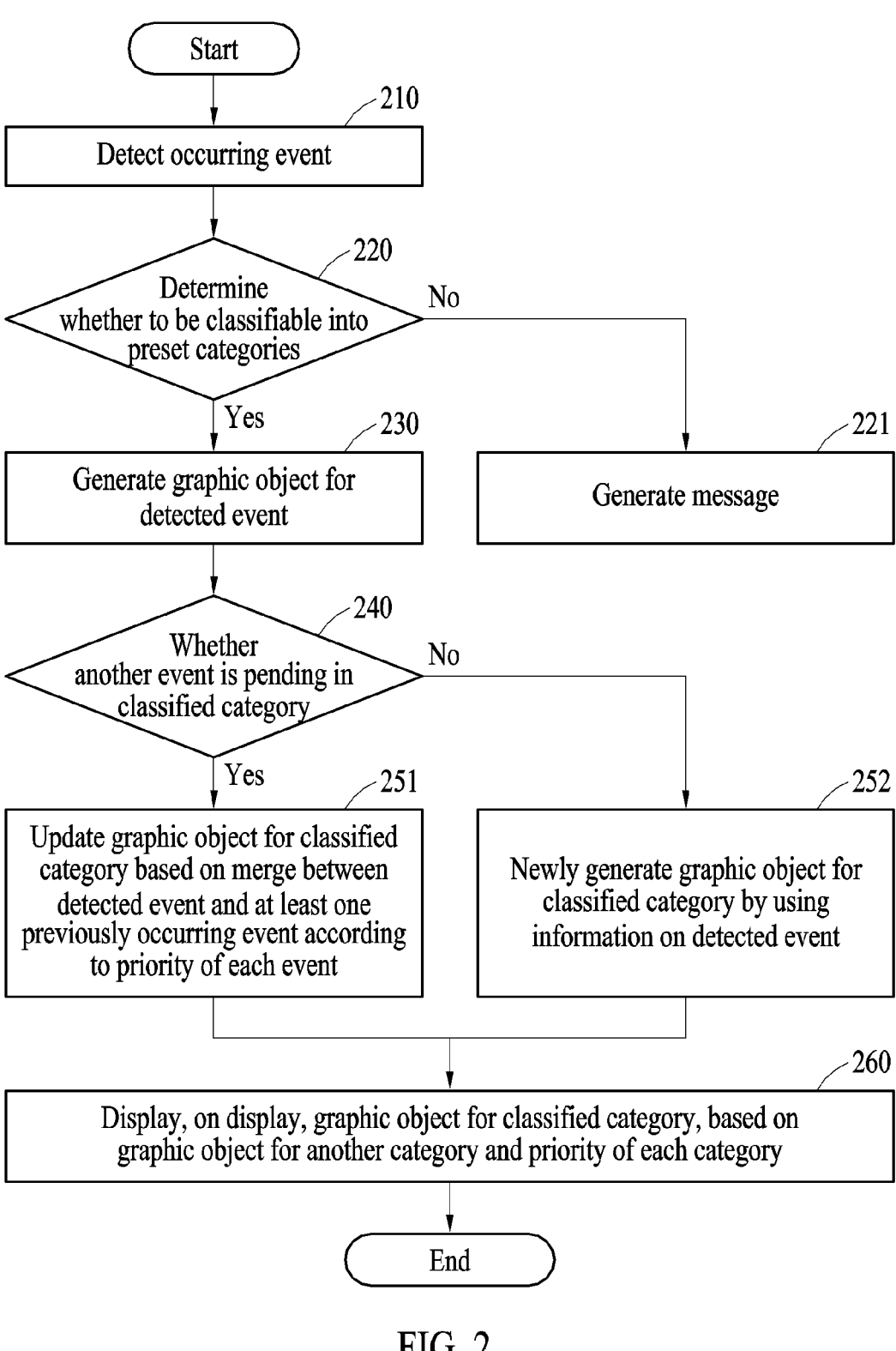

FIG. 2 is a flowchart illustrating an operation of an electronic device according to an embodiment.

In operation 210, the electronic device may detect an event occurring in at least one IoT device. The electronic device may receive information on the detected event from the at least one IoT device in response to detecting the event occurring in the at least one IoT device.

In operation 220, the electronic device may determine whether the detected event may be classified into one category among preset categories. The priorities of the preset categories may be set according to respective functions corresponding to each of the preset categories. The preset categories may include, for example, an "abnormal detection" category, a "device offline" category, a "cooking state" category, a "door open" category, a "remaining operation time" category, a "battery replacement notification" category, a "home monitoring" category, and a "weather information" category. However, the examples of the preset categories are not limited to the foregoing examples.

In operation 221, the electronic device may render information on the detected event via a notification message when the detected event is not classified into any of the preset categories and provide the user with the notification message. The electronic device may determine the importance of the information on the detected event to be low when the detected event is not classified into any of the preset categories. Accordingly, the electronic device may render the information on the detected event via the notification message, instead of a graphic object, and provide the notification message.

In operation 230, when the detected event is classified into one category of the preset categories, the electronic device may generate a graphic object for the detected event by using the received information on the detected event.

In operation 240, with respect to the category into which the detected event is classified, the electronic device may determine whether at least one previously occurring event is pending in the classified category.

In operation 251, when the at least one previously occurring event is pending in the category into which the detected event is classified, the electronic device may merge the detected event and the at least one previously occurring event according to a priority of each event in the category into which the detected event is classified. A processor of the electronic device may update a graphic object for the classified category based on the merge between the detected event and the at least one previously occurring event. The graphic object for the category is already generated because there is the at least one event pending in the category before the electronic device detects the newly occurring event. Accordingly, the electronic device may notify the user of the detection of the new event classified into the category by updating the graphic object for the category.

According to an embodiment, the electronic device may select a representative event having the highest priority from the detected event and the at least one other event when merging the detected event and the at least one other event pending in the category. The electronic device may update the graphic object for the category based on the information on the representative event and the number of events pending in the category. The update of the graphic object for the category is described below.

In operation 252, when there is no previously occurring event pending in the category into which the detected event is classified, the electronic device may newly generate the graphic object for the classified category by using information on the detected event that is received from the at least one IoT device. The graphic object for the category is not previously generated because there is no event pending in the category into which the detected event is classified before the electronic device detects the newly occurring event. Accordingly, the electronic device may notify the user of the occurrence of the new event classified into the category by newly generating the graphic object for the category.

According to an embodiment, the electronic device may select a representative event having the highest priority from the detected event and the at least one other event when merging the detected event and the at least one other event pending in the category. The electronic device may update the graphic object for the category based on the information on the representative event and the number of events pending in the category. The electronic device may also newly generate the graphic object for the category by using the received information on the detected event in response to classifying the detected event into the category in which the other event previously occurring is not pending among the preset categories. The electronic device may display the generated graphic object on a display based on a graphic object for another category and the priority of each category. In addition, when there is no previously occurring event pending in the category into which the detected event is classified, the electronic device may set the detected event as the representative event of the category. Similar to operation 251, the electronic device may newly generate the graphic object for the classified category based on the information on the representative event and the number of events pending in the category.

In operation 260, the electronic device may display, on the display, the graphic object for the category into which the detected event is classified, based on a graphic object for another category and a priority of each category. When the graphic object for the classified category is updated in operation 251, the processor of the electronic device may display, on the display, the updated graphic object, based on a graphic object for another category and a priority of each category. When the graphic object for the classified category is newly generated in operation 252, the processor of the electronic device may display, on the display, the generated graphic object, based on a graphic object for another category and a priority of each category. According to an embodiment, even when displaying graphic objects for other categories on the display, the electronic device may scroll the graphic objects to display the graphic object for the category into which the detected event is classified when detecting the new event. When detecting the newly occurring event, the electronic device may notify the user of the detection of the new event classified into the category by displaying, on the display, the graphic object for the category into which the detected event is classified.

Hereinafter, a priority of each category is described in detail.

The priority of each category may be set according to a function corresponding to each of the preset categories. According to an embodiment, the electronic device may classify a newly detected event into one category among the preset categories based on a function indicated by the newly detected event. A function corresponding to each category is described below.

First, an event requiring a function of detecting an abnormal situation may be classified into the "abnormal detection" category. The "abnormal detection" category may be set as a category of a top priority (hereinafter, a "first category"). The electronic device may classify the event requiring the function of detecting an abnormal situation, such as intrusion or smoke (e.g., carbon monoxide), into the first category. A graphic object for the event classified into the "abnormal detection" category may display the detected abnormality. The electronic device may detect the event requiring the function of detecting an abnormal situation from an IoT device of a smart hub and a starter kit sensor (e.g., a door sensor, a smog sensor, a camera, etc.).

An event requiring a function of detecting an offline state of an IoT device may be classified into the "device offline" category. The "device offline" category may be set as a category of a second priority (hereinafter, a "second category"). The electronic device may classify the event requiring the function of detecting an offline state of an IoT device, such as the disconnection of the smart hub or the disconnection of a security camera, into the second category. A graphic object for the event classified into the "device offline" category may display the IoT device changed to offline. The electronic device may detect the event requiring the function of detecting an offline state from the IoT device, such as the smart hub or the security camera.

An event requiring a function of detecting a cooking state may be classified into the "cooking state" category. The "cooking state" category may be set as a category of a third priority (hereinafter, a "third category"). The electronic device may classify the event requiring the function of detecting a cooking state, such as the use of an oven or the use of a gas stove, into the third category. The electronic device may detect the event requiring the function of detecting a cooking state from an IoT device for a cooking device, such as the oven, an induction heating surface, or a microwave.

An event requiring a function of detecting door opening may be classified into the "door open" category. The "door open" category may be set as a category of a fourth priority (hereinafter, a "fourth category"). The electronic device may classify the event requiring the function of detecting the opening, such as the opening of a door or the unlocking of a door lock, into the fourth category. The electronic device may detect the event requiring the function of detecting the door opening from an IoT device, such as an open/close sensor.

An event requiring a function of providing the information on a remaining operation time of an IoT device may be classified into the "remaining operation time" category. The "remaining operation time" category may be set as a category of a fifth priority (hereinafter, a "fifth category"). The electronic device may classify the event requiring the function of providing the information on a remaining operation time of an IoT device, such as an event related to an operation of a washing machine or an event related to an operation of a drying machine, into the fifth category. A graphic object for the event classified into the "remaining operation time" category may display the remaining operation time of the operating IoT device. The electronic device may detect the event requiring the function of providing the information on a remaining operation time from an IoT device (e.g., the washing machine, the drying machine, a dishwasher, etc.) having a cycle.

An event requiring a function of detecting a device requiring battery replacement may be classified into the "battery replacement notification" category. The "battery replacement notification" category may be set as a category of a sixth priority (hereinafter, a "sixth category"). The electronic device may classify an event of detecting a battery shortage of a specific IoT device into the sixth category. A graphic object for the event classified into the "battery replacement notification" category may display the IoT device requiring the battery replacement.

An event requiring a function of providing the information on a monitoring state may be classified into the "home monitoring" category. The "home monitoring" category may be set as a category of a seventh priority (hereinafter, a "seventh category"). The electronic device may classify an event, during which an abnormal situation is not detected in the smart hub or the starter kit sensor, into the seventh category. A graphic object for the event classified into the "home monitoring" category may display a monitoring state (e.g., a "normal status"). The electronic device may detect the event requiring the function of providing the information on a monitoring state from an IoT device of the smart hub and the starter kit sensor (e.g., the door sensor, the smog sensor, the camera, etc.).

An event requiring a function of providing weather information may be classified into the "weather information" category. The "weather information" category may be set as a category of an eighth priority (hereinafter, an "eighth category"). The electronic device may classify the event providing weather information into the eighth category. A graphic object for the event classified into the "weather information" category may display weather information, such as temperature or humidity. However, the examples of the preset categories are not limited to the foregoing examples, and another category corresponding to another function may be set.

According to an embodiment, the electronic device may select a representative event having the highest priority from the detected event and the at least one other event when merging the detected event and the at least one other event pending in the category. The electronic device may update the graphic object for the category based on the information on the representative event and the number of events pending in the category. The electronic device may also newly generate the graphic object for the category by using the received information on the detected event in response to classifying the detected event into the category in which the other event previously occurring is not pending among the preset categories. The electronic device may display the generated graphic object on a display based on a graphic object for another category and the priority of each category. In this case, the priority of each category may be set according to a function corresponding to each of the preset categories, and the processor of the electronic device may classify the detected event into one category among the preset categories based on a function indicated by the detected event.

Figure 3:
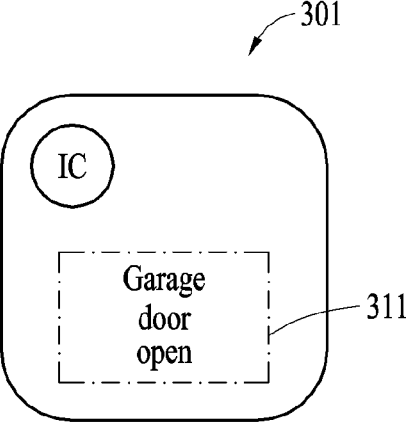
FIG. 3 illustrates an example of a graphic object generated for a detected event by the electronic device according to an embodiment.

FIG. 3 illustrates an example of a graphic object generated for a detected event by the electronic device according to an embodiment.

According to an embodiment, in response to detecting an event occurring in at least one IoT device, the electronic device may generate a graphic object 301 by using the received information on the detected event. The electronic device may detect an event indicating a "garage door open" from one IoT device. The electronic device may determine whether the detected event may be classified into one category among preset categories. The electronic device may classify the event indicating the "garage door open" into a third category, based on a function, required by the detected event, of detecting the door opening. The electronic device may generate the graphic object 301 corresponding to the detected event by using the information on the event indicating the "garage door open" received from the IoT device. The graphic object 301 may include a graphic object 311 displaying the information on the detected event.

Figure 4A:
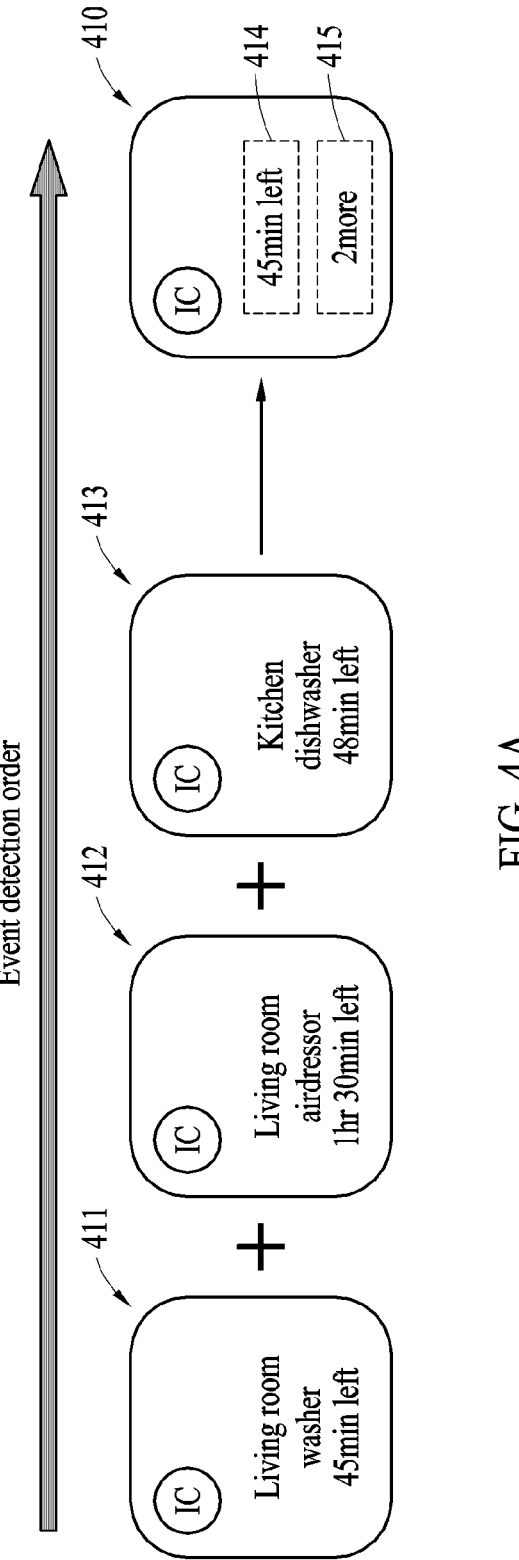
FIGS. 4A and 4B each illustrate an operation of merging events pending in one category according to a priority of each event by the electronic device according to an embodiment.
Figure 4B:
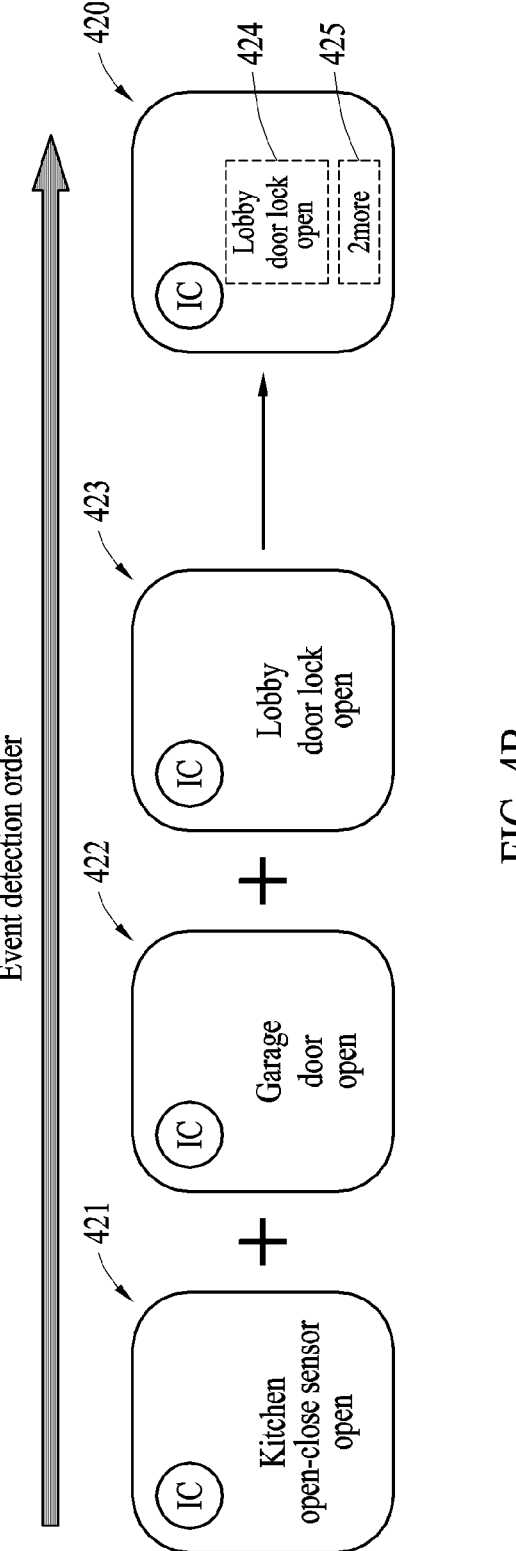

FIGS. 4A and 4B each illustrate an operation of merging events pending in one category according to a priority of each event by the electronic device according to an embodiment.

FIG. 4A illustrates an example of merging events pending in a fifth category, based on priorities according to a remaining operation time of the events by the electronic device according to an embodiment.

According to an embodiment, the electronic device may generate respective graphic objects corresponding to categories. The electronic device may individually update or generate the graphic objects for categories into which all events pending in the electronic device are classified. Referring to FIG. 4A, the electronic device may update or generate a graphic object 410 for the fifth category, based on the merge of the events pending in the fifth category. An event requiring a function of providing the information on a remaining operation time may be classified into the fifth category among preset categories. For example, an event indicating "45 minutes are left for the operation of the washing machine in the living room", an event indicating "an hour and a half is left for the operation of the air dresser in the living room", and an event indicating "48 minutes are left for the operation of the dishwasher in the kitchen" may be pending in the fifth category. Referring to FIG. 4A, the electronic device may sequentially generate a graphic object 411 for the event indicating "45 minutes are left for the operation of the washing machine in the living room", a graphic object 412 for the event indicating "an hour and a half is left for the operation of the air dresser in the living room", and a graphic object 413 for the event indicating "48 minutes are left for the operation of the dishwasher in the kitchen" according to an order of the occurring events being detected.

According to an embodiment, the electronic device may generate a graphic object for a category by merging events pending in the category according to a priority of each event. In this case, the priority of each event may be set differently in each category. For example, the priority of each event set for the fifth category may be a priority according to a remaining operation time of each event. However, the priority of each event set for each category is not limited to the foregoing example.

According to an embodiment, the electronic device may merge the pending events according to the priority of each event set in the fifth category. The electronic device may merge the events pending in the fifth category according to a priority according to an event remaining time. For example, the priority of each event may be set in an ascending order from the smallest remaining operation time. Since each of the events pending in the fifth category includes the information on a remaining event operation time, the electronic device may determine the priorities of the events in the ascending order from the smallest remaining event operation time. Referring to FIG. 4A, the event indicating "45 minutes are left for the operation of the washing machine in the living room" may be set to have the highest priority, the event indicating "48 minutes are left for the operation of the dishwasher in the kitchen" may be set to have the next highest priority, and the event indicating "an hour and a half is left for the operation of the air dresser in the living room" may be set to have the lowest priority.

According to an embodiment, the electronic device may update a graphic object for a category by merging events pending in the category according to a priority of each event. According to an embodiment, the electronic device may set the event of the highest priority in the category as a representative event and may display the information on the representative event on the graphic object for the category. For example, referring to FIG. 4A, the electronic device may set the event indicating "45 minutes are left for the operation of the washing machine in the living room" in which the remaining event operation time is the smallest in the fifth category as the representative event. The electronic device may generate the graphic object 410 by using the information on the set representative event. Referring to FIG. 4A, the graphic object 410 for the fifth category may include a graphic object 414 displaying the information (e.g., the information on the event remaining time of the representative event) on the representative event of the highest priority. In addition, the graphic object 410 for the fifth category may further include a graphic object 415 displaying the information on the number (e.g., 2) of events, excluding the representative event, pending in the fifth category.

In addition, according to an embodiment, the electronic device may display, on a display, an interface screen for controlling an IoT device (e.g., "washing machine") in which the representative event occurs in response to the interaction of a user with the graphic object 414. The electronic device may provide the user with further detailed information on the representative event through the interface screen for the IoT device displayed on the display.

The electronic device may provide the user with the information on all the events pending in the fifth category according to the priority (e.g., the priority according to an event remaining time) of each event of the fifth category in response to the interaction of the user with the graphic object 415. For example, the electronic device may sequentially display, on the display, the graphic objects 411, 412, and 413 for the events pending in the fifth category according to the priority of each event in response to the interaction of the user with the graphic object 415.

FIG. 4B illustrates an example of merging events pending in a category, based on priorities according to an event occurrence position by the electronic device according to an embodiment.

Referring to FIG. 4B, the electronic device may update or generate a graphic object 420 for a fourth category, based on the merge of events pending in the fourth category. An event requiring a function of detection door opening may be classified into the fourth category among the preset categories. For example, an event indicating "the opening of the open/close sensor in the kitchen is detected", an event indicating "the opening of the garage door is detected", and an event indicating "the unlocking of the door lock in the lobby is detected" may be pending in the fourth category. Referring to FIG. 4B, the electronic device may sequentially generate a graphic object 421 corresponding to the event indicating "the opening of the open/close sensor in the kitchen is detected", a graphic object 422 corresponding to the event indicating "the opening of the garage door is detected", and a graphic object 423 corresponding to the event indicating "the unlocking of the door lock in the lobby is detected" according to an order of the occurring event being detected.

According to an embodiment, the electronic device may generate a graphic object for a category by merging events pending in the category according to a priority of each event. For example, the priority of each event set for the fourth category may be a priority according to an occurrence target of each event. However, the priority of each event set for each category is not limited to the foregoing example.

According to an embodiment, the electronic device may merge the pending events according to the priority of each event set in the fourth category. The electronic device may merge the events pending in the fourth category according to the priorities based on event occurrence targets. For example, the priority of each event may be set in an order of the door lock, the garage door, and the open/close sensor of the event occurrence targets. Since each of the events pending in the fourth category includes the information on an event occurrence target, the electronic device may determine the priorities of the events according to the event occurrence targets. Referring to FIG. 4B, the event indicating "the unlocking of the door lock in the lobby is detected" may be set to have the highest priority, the event indicating "the opening of the garage door is detected" may be set to have the next highest priority, and the event indicating "the opening of the open/close sensor in the kitchen is detected" may be set to have the lowest priority.

According to an embodiment, the electronic device may set an event of the highest priority among pending events in a category as a representative event and may display the information on the representative event on a graphic object for the category. Referring to FIG. 4B, the electronic device may set the event indicating "the unlocking of the door lock in the lobby is detected" in which the event occurrence target is the door lock in the fourth category as the representative event. The electronic device may generate the graphic object 420 by using the information on the set representative event. The graphic object 420 for the fourth category may include a graphic object 424 displaying the information on the representative event of the highest priority. In addition, the graphic object 420 for the fourth category may further include a graphic object 425 displaying the information on the number (e.g., 2) of events, excluding the representative event, pending in the fourth category.

For another example, the priority of each event set for a third category may be a priority according to an event occurrence order. The electronic device may merge events pending in the third category according to the priorities according to the event occurrence order. Since each of the events pending in the third category includes the information on an event occurrence time, the electronic device may determine the priorities of the events in an order from the earliest event occurrence time. For example, when an event occurrence time for the use of an oven is earlier than an event occurrence time for the use of a gas stove, the priority of the event of the oven use is set to be higher than the priority of the event of the gas stove use.

Figure 5:
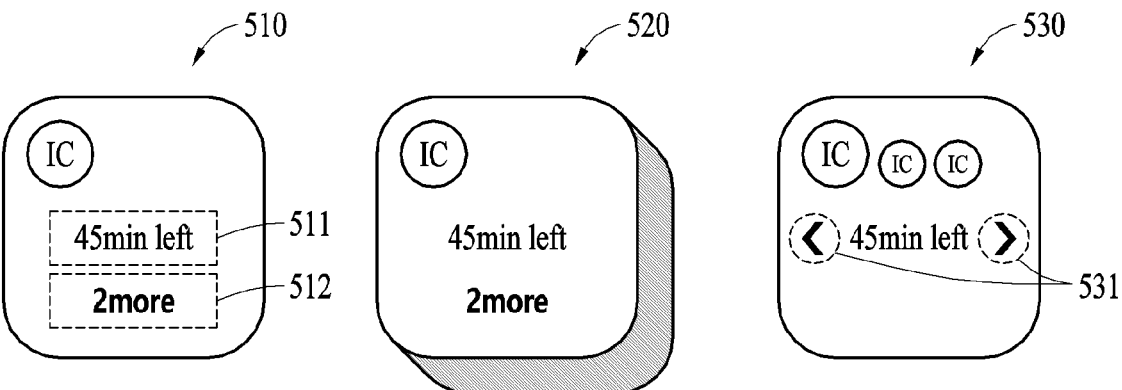
FIG. 5 illustrates an example of generating a graphic object for a category by the electronic device according to an embodiment.

FIG. 5 illustrates an example of generating a graphic object for a category by the electronic device according to an embodiment.

According to an embodiment, the electronic device may generate or update a graphic object for a category by merging events pending in the category according to a priority of each event. In this case, the graphic object for the category may be visualized in various manners, such as a graphic object 510, a graphic object 520, and a graphic object 530. The graphic objects 510, 520, and 530 for the category may include information on a representative event of the highest priority among events pending in the category and information on the number of the events pending in the category.

For example, the graphic object 510 may include a graphic object 511 displaying the information on the representative event and a graphic object 512 displaying the information on the number of the events, excluding the representative event, pending in the category. In this case, the electronic device may display the color of the graphic object 511 differently from the color of the graphic object 512. For another example, the graphic object 520 may have a shape of overlapping layers to indicate that the events pending in the category are plural. Yet another example, the graphic object 530 may include a graphic object 531 in an arrow shape. The electronic device may change the content displayed on the graphic object 530 to information on an event other than the representative event in response to the interaction of a user with the graphic object 531.

Figure 6:
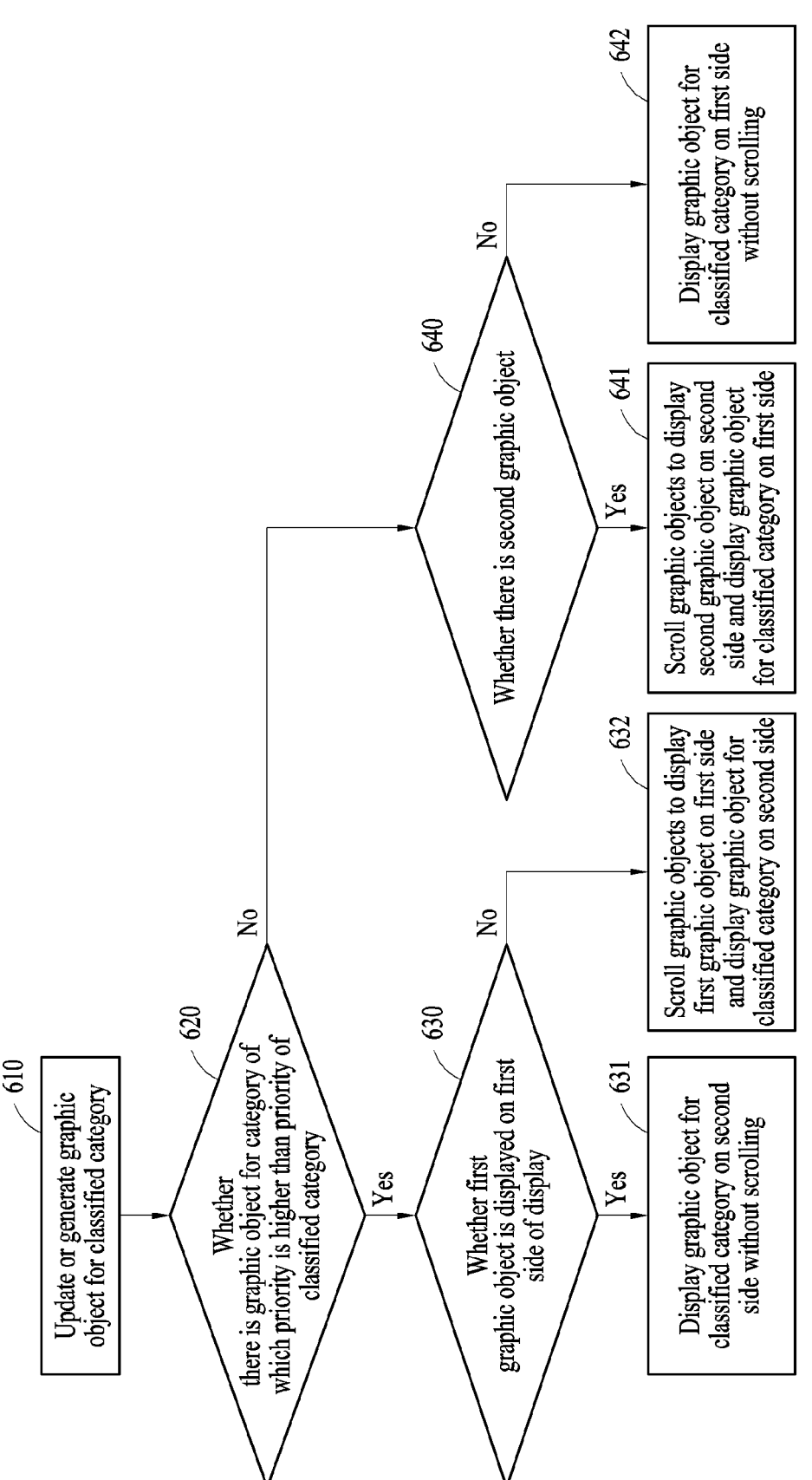
FIG. 6 is a flow chart illustrating an operation of displaying a graphic object for a category on a display by the electronic device according to an embodiment.

FIG. 6 illustrates an operation of displaying a graphic object for a category on a display by the electronic device according to an embodiment.

According to an embodiment, the electronic device may update the graphic object for the category when classifying a detected event into the category in which a previously occurring event is pending among preset categories. The electronic device may display the updated graphic object for the category on the display in response to updating the graphic object for the category into which the detected event is classified. The electronic device may display the updated graphic object on the display, based on a graphic object for another category and a priority of each category. After the graphic object for the category is updated, the electronic device may scroll other graphic objects to display the updated graphic object on the display and provide a user with information on the detected event.

According to another embodiment, the electronic device may newly generate a graphic object for a category when classifying the detected event into the category in which the previously occurring event is not pending among preset categories. The electronic device may display the newly generated graphic object for the classified category on the display in response to newly generating the graphic object for the category into which the detected event is classified. The electronic device may display the newly generated graphic object on the display, based on a graphic object for another category and the priority of each category. After the graphic object for the category is generated, the electronic device may scroll other graphic objects to display the newly generated graphic object on the display and provide the user with the information on the detected event. Hereinafter, the process of displaying the graphic object for the category into which the detected event is classified is further described in detail.

In operation 610, the electronic device may update or newly generate a graphic object for a category into which an event is classified when the event that occurs in one IoT device is detected.

In operation 620, the electronic device may determine whether the electronic device includes a graphic object for a category of which a priority is higher than a priority of the category into which the detected event is classified.

In operation 630, the electronic device may determine whether a first graphic object is displayed on a first side of the display when there is the graphic object for the category of which the priority is higher than the priority of the classified category. The first graphic object may be a graphic object for a category in which the priority of the category is higher than the priority of the category into which the detected event is classified among categories in which respective graphic objects are generated and a difference between the priority of the category and the priority of the classified category is the smallest. In this case, the categories in which the respective graphic objects are generated may be categories into which all events pending in the electronic device before a newly occurring event is detected are classified.

Hereinafter, the example of displaying two graphic objects among graphic objects for categories on the display of the electronic device is mainly described. However, examples are not limited thereto, and more than two graphic objects for categories may be displayed on the display.

For example, the graphic objects for categories may be arranged from left to right according to the priorities of the categories. In this case, the first side may be a left side of the display based on the center of the display. A second side may be a right side of the display based on the center of the display. The graphic objects for categories displayed on the display may change as the electronic device scrolls the graphic objects for categories left and right.

For another example, the graphic objects for categories may be arranged from top to bottom on the display according to the priorities of the categories. In this case, the first side may be a top side of the display based on the center of the display. The second side may be a bottom side of the display based on the center of the display. The graphic objects for categories displayed on the display may change as the electronic device scrolls the graphic objects for categories up and down.

The second side may be a side opposite to the first side of the display based on the center of the display. When a graphic object for a specific category is displayed on the first side of the display of the electronic device, a graphic object for a category of which a priority is lower than a priority of the specific category may be displayed on the second side thereof.

In operation 631, when the first graphic object is displayed on the first side of the display, the electronic device may display the graphic object for the category into which the detected event is classified on the second side that is opposite to the first side without scrolling graphic objects. When newly generating the graphic object for the category into which the detected event is classified, the electronic device may move a graphic object for a category of which a priority is lower than the priority of the classified category in a first direction. In this case, the first direction may be a direction from the first side to the second side.

In operation 632, when the first graphic object is not displayed on the first side of the display, the electronic device may scroll the graphic objects for categories to display the first graphic object on the first side and may display the graphic object for the category into which the detected event is classified on the second side that is opposite to the first side. When newly generating the graphic object for the category into which the detected event is classified, the electronic device may move a graphic object for a category of which a priority is lower than the priority of the classified category in a first direction.

In operation 640, the electronic device may determine whether the electronic device includes a second graphic object when there is no graphic object for a category of which a priority is higher than the priority of the classified category. The second graphic object may be a graphic object for a category in which the priority of the category is lower than the priority of the category into which the detected event is classified among categories in which respective graphic objects are generated and a difference between the priority of the category and the priority of the classified category is the smallest. For example, when the priority of the category into which the detected event is classified is the lowest among the categories in which the respective graphic objects are generated, there may be no second graphic object.

In operation 641, when there is the second graphic object, the electronic device may scroll the graphic objects to display the second graphic object on the second side and may display the graphic object for the category into which the detected event is classified on the first side that is opposite to the second side.

In operation 642, when there is no second graphic object, the electronic device may display the graphic object for the classified category on the first side without scrolling. There being no first graphic object and no second graphic object indicates that the electronic device includes no graphic objects other than the graphic object for the category into which the detected event is classified. Accordingly, the electronic device may display the graphic object for the classified category on the first side of the display.

In addition, the electronic device may display more than two graphic objects for categories on the display. In this case, the electronic device may display the graphic object for the category into which the detected event is classified as below. First, when there is the first graphic object, the electronic device may display the first graphic object on the first side and the graphic object for the category into which the detected event is classified on a position adjacent to the first graphic object in a second direction. In this case, the second direction may be a direction from the first side to the second side. In addition, when there is no first graphic object and there is the second graphic object, the electronic device may display the second graphic object on the second side and the graphic object for the category into which the detected event is classified on a position adjacent to the second graphic object in the first direction.

FIGS. 7A to 7D each illustrate an operation of displaying, on a display, a graphic object for a category into which a detected event is classified. Hereinafter, the example of newly generating the graphic object for the category into which the detected event is classified and the example of arranging graphic objects for categories from left to right are mainly described. In this case, a first side may be the left of the display, and a second side may be the right of the display.

Figure 7A:
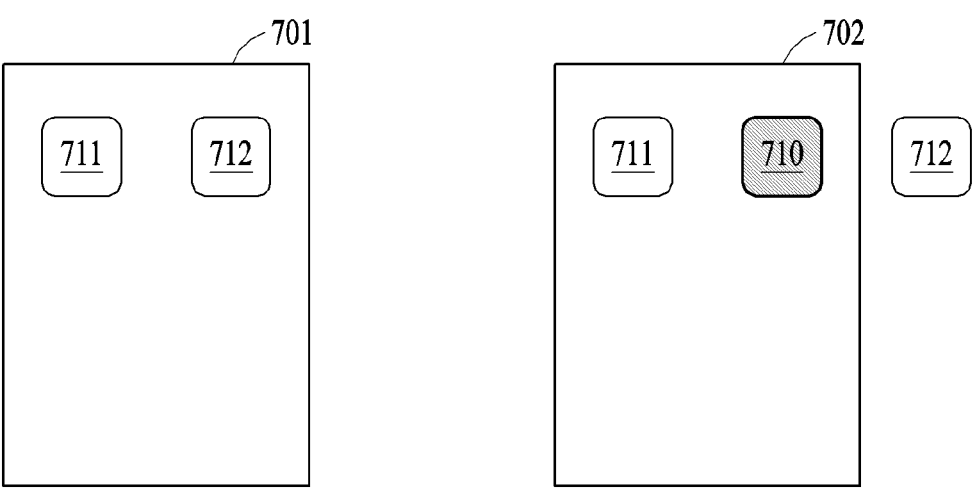
FIGS. 7A to 7D each illustrate an operation of displaying, on a display, a graphic object for a category into which a detected event is classified.

FIG. 7A illustrates operation 631 of FIG. 6 in detail. The electronic device may newly generate a graphic object 710 for the category into which the detected event is classified. It is assumed that there is a first graphic object 711, that is, a graphic object for a category of which a priority is higher than a priority of the category into which the detected event is classified and in which a difference between the priority of the category and the priority of the classified category is the smallest, and the first graphic object 711 is displayed on the left of a display 701. The electronic device may display the graphic object 710 for the category into which the detected event is classified on the right of a display 702 without scrolling graphic objects. The electronic device may move graphic objects (e.g., a graphic object 712) for a category of which a priority is lower than the priority of the category into which the detected event is classified to the right. Accordingly, the graphic object 712 may not be displayed on the display 701.

Figure 7B:
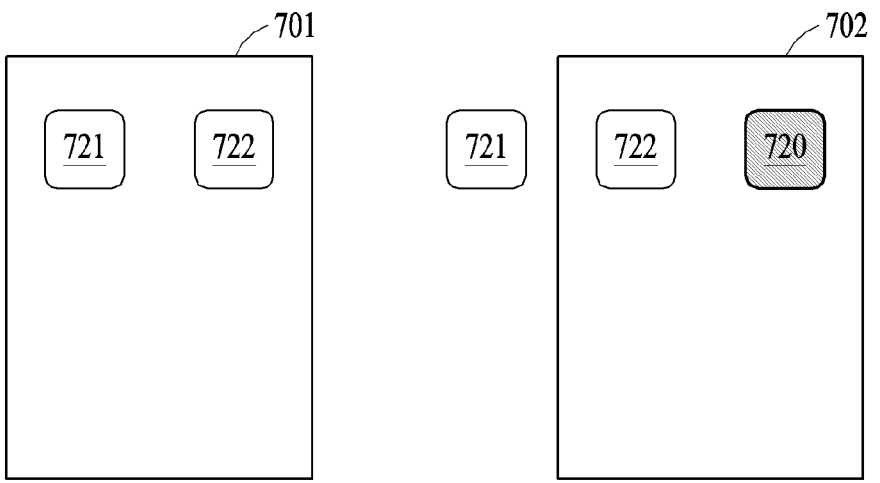

FIG. 7B illustrates operation 632 of FIG. 6 in detail. The electronic device may newly generate a graphic object 720 for the category into which the detected event is classified. It is assumed that the electronic device includes a first graphic object 721 and the first graphic object 721 is not displayed on the left of the display 701. The electronic device may scroll graphic objects for categories to display the first graphic object 721 on the left of the display 701. When displaying the first graphic object 721 on the left of the display 701, the electronic device may display the graphic object 720 for the classified category on the right of the display 702. Similar to FIG. 7A, the electronic device may move graphic objects for categories of which a priority is lower than the priority of the category into which the detected event is classified to the right.

Figure 7C:
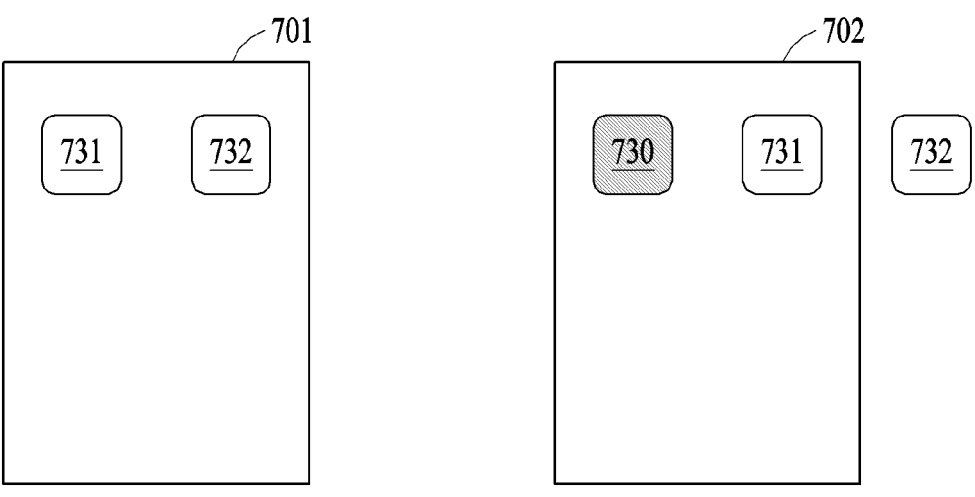

FIG. 7C illustrates operation 641 of FIG. 6 in detail. The electronic device may newly generate a graphic object 730 for the category into which the detected event is classified. It is assumed that the electronic device does not include a first graphic object and includes a second graphic object 731. The electronic device may scroll graphic objects for categories to display the second graphic object 731 on the right of the display 702 and may display the graphic object 730 for the category into which the detected event is classified on the left side.

Figure 7D:
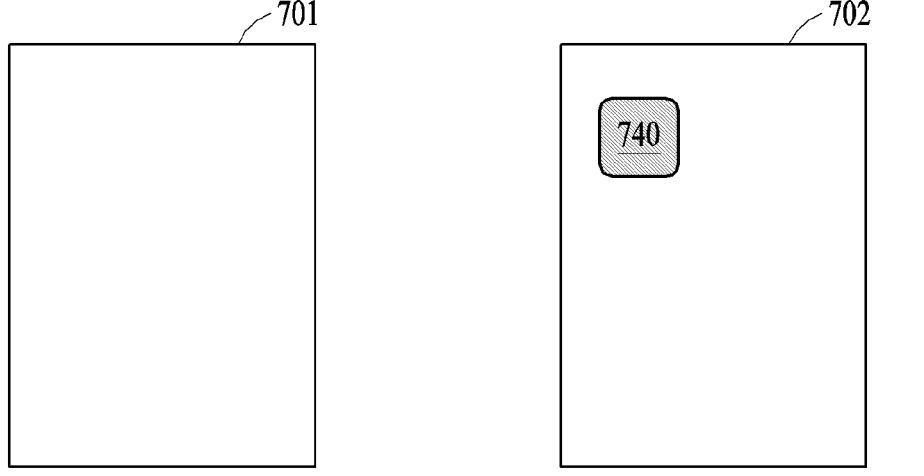

FIG. 7D illustrates operation 642 of FIG. 6 in detail. The electronic device may newly generate a graphic object 740 for the category into which the detected event is classified. It is assumed that the electronic device does not include a first graphic object nor a second graphic object. The electronic device may display the graphic object 740 on the left of the display 702.

In addition, when determining that a user verifies a generated or updated graphic object through the display, the electronic device may change the graphic object displayed on the display to a graphic object for a category of which a priority is higher. For example, when detecting an interaction of the user with the generated or updated graphic object, the electronic device may display graphic objects for categories in a descending order from a highest priority.

Figure 8:
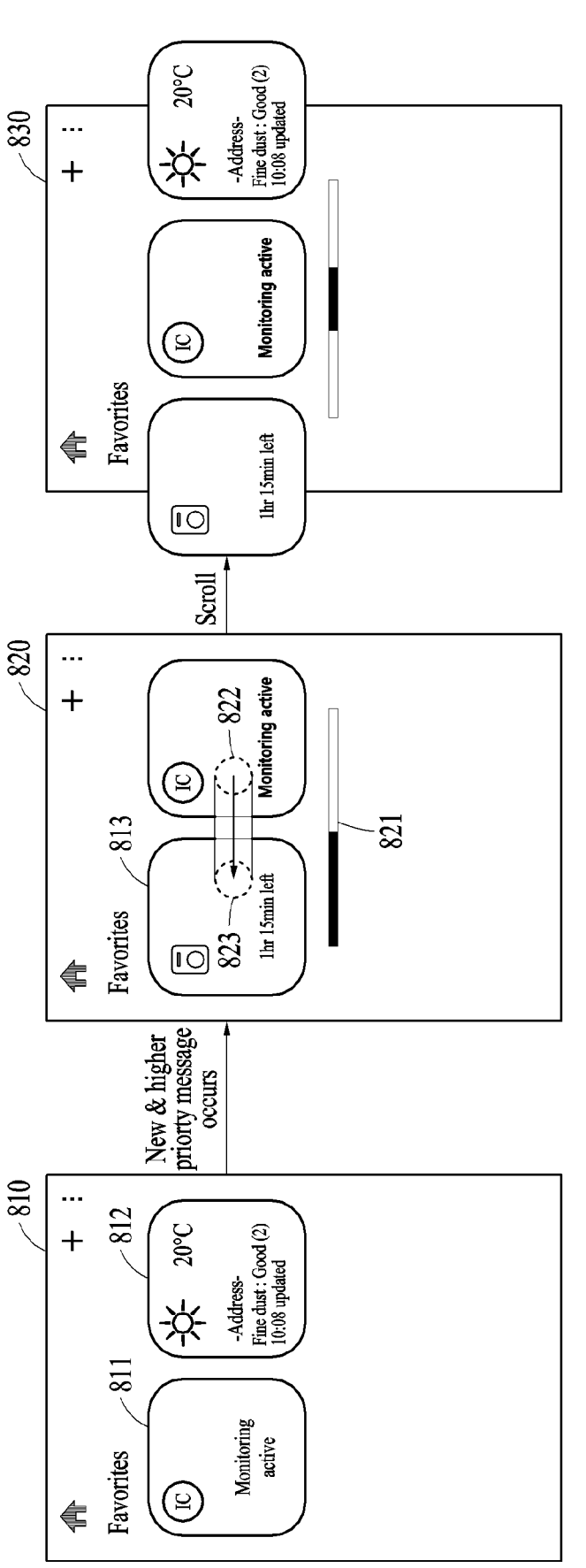
FIG. 8 illustrates a process of displaying a scroll bar for searching for graphic objects on a display by the electronic device according to an embodiment.

FIG. 8 illustrates a process of displaying a scroll bar for searching for graphic objects on a display by the electronic device according to an embodiment.

According to an embodiment, before detecting a newly occurring event, the electronic device may display graphic objects 811 and 812 for a category on the display in a descending order from the highest priority of a category. When detecting the newly occurring event, the electronic device may classify the detected event into one of predetermined categories and may update or newly generate a graphic object for the classified category. When generating or updating the graphic object for the category into which the detected event is classified, the electronic device may display a graphic object 813 for the classified category on a display 820.

When displaying the graphic object 813 for the classified category on the display 820, the electronic device may display a scroll bar 821 for searching for graphic objects on the display 820 for less than or equal to a threshold time and may release the display of the scroll bar 821 when the threshold time elapses. For example, the threshold time may be a second, but examples are not limited thereto. According to an embodiment, when detecting an interaction of a user in an area displaying a graphic object on the display, the electronic device may regenerate the scroll bar 821 and display the scroll bar 821 for less than or equal to the threshold time.

In addition, when receiving a drag input from the user from a start point 822 to an end point 823, the electronic device may scroll graphic objects from the start point 822 to the end point 823. The drag input may be an input in which a touch occurs at a point (e.g., the start point 822) on the display, the touch moves while being maintained, and the touch is released in another point (e.g., the end point 833) on the display. When receiving the drag input from the user, the electronic device may change a graphic object displayed on a display 830 by scrolling graphic objects.

In addition, the electronic device may select a location when displaying a graphic object for a category on the display. For example, when selecting "home" as the location, the electronic device may display only information on an event occurring in an IoT device for detecting a state of the home through the graphic object. For another example, when selecting "office" as the location, the electronic device may display only information on an event occurring in an IoT device for detecting a state of the office through the graphic object.

Figure 9:
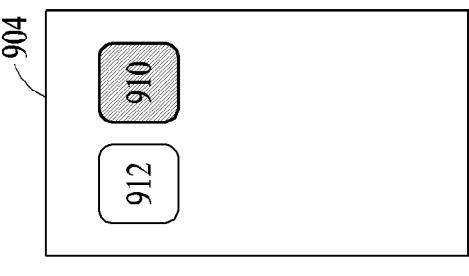
FIGS. 9 to 11 each illustrate an animation effect added to a graphic object when the graphic object is displayed by the electronic device according to an embodiment.
Figure 9:
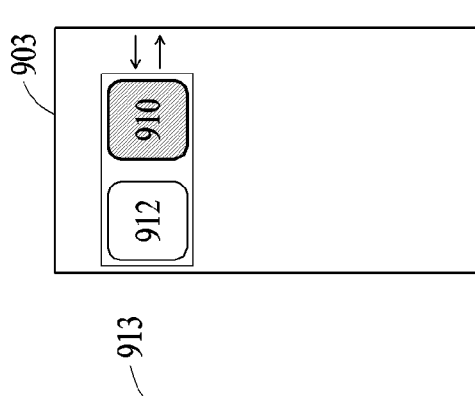
Figure 9:
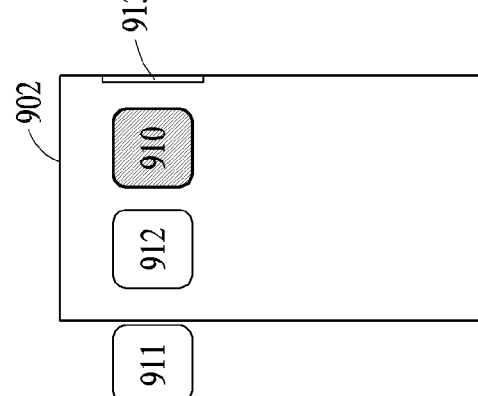
Figure 9:
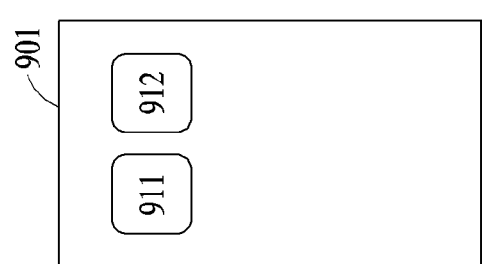
Figure 10:
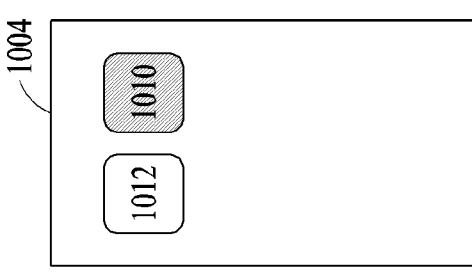
Figure 10:
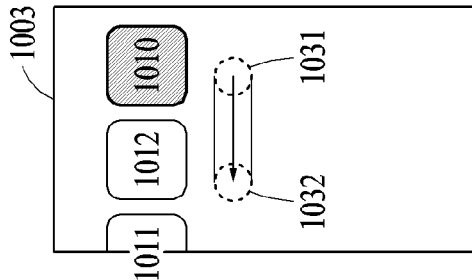
Figure 10:
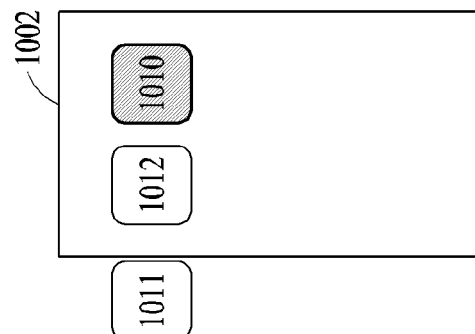
Figure 10:
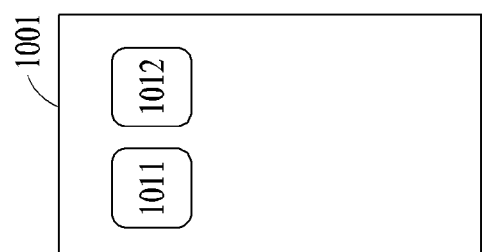
Figure 11:
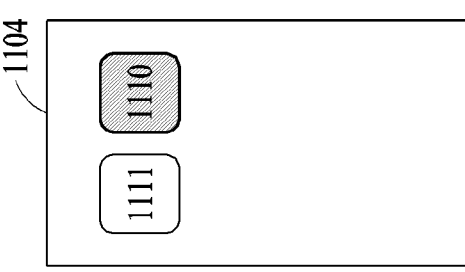
Figure 11:
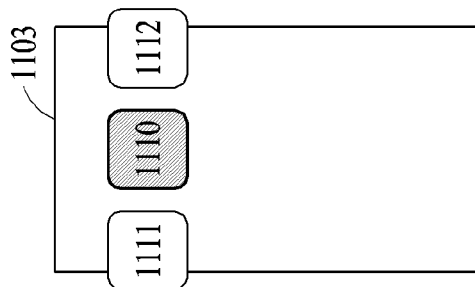
Figure 11:
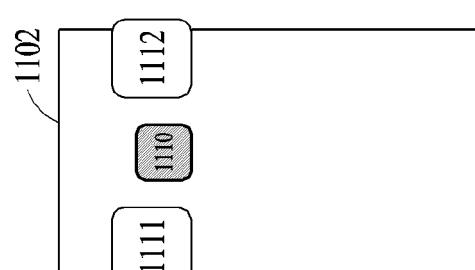
Figure 11:
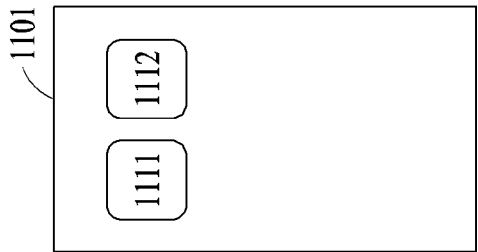

FIGS. 9 to 11 each illustrate an animation effect added to a graphic object when the graphic object is displayed by the electronic device according to an embodiment.

Referring to FIG. 9, the electronic device may display graphic objects 911 and 912 on a display 901. When detecting an event occurring in an IoT device, the electronic device may update or generate a graphic object 910 for a category into which a detected event is classified.

The electronic device may display the graphic object 910 for the classified category and another graphic object for another category, based on a priority of each category, on a display 902. The graphic object 910 for the classified category is assumed to be displayed on the right side of the display. In this case, the electronic device may indicate that the graphic object 910 is updated or generated according to event detection by adding an animation effect to the graphic objects 910 and 912 displayed on the display 902.

Specifically, when displaying the graphic object 910 for the category into which the detected event is classified on the display, the electronic device may repeat an operation of moving all the graphic objects 910 and 912 displayed on the display closer to an edge 913 of the display and moving all those graphic objects 910 and 912 farther from the edge 913 of the display for a predetermined number of times based on the edge 913 of the display adjacent to a position (e.g., the right side of the display) in which the graphic object for the classified category is displayed on the display. Then, the electronic device may display the graphic object 910 on the right side of the display and the graphic object 912 on the left side of the display.

Referring to FIG. 10, a display 1001 of an electronic device may display graphic objects 1011 and 1012 for a category. When detecting an event occurring in an IoT device, the electronic device may update or generate a graphic object 1010 for a category into which a detected event is classified.

The electronic device may display the graphic object 1010 for the classified category and another graphic object for another category, based on a priority of each category, on a display 1002. The graphic object 1010 for the category into which the detected event is classified is assumed to be displayed on the right side. In this case, when displaying the graphic object 1010 for the classified category, the electronic device may display some of the graphic object 1011 on a display 1003 without deleting the graphic object 1011 from the display 1003. The electronic device may indicate that the graphic object 1010 is updated or generated according to event detection by displaying some of the graphic object 1011 on the display 1003.

In addition, when receiving a drag input from a user from a start point 1031 to an end point 1032 on the display 1003, the electronic device may scroll graphic objects from the start point 1031 to the end point 1032. When receiving the drag input from the user, the electronic device may display the graphic object 1010 on the right side of a display and the graphic object 1012 on the left side of the display.

Referring to FIG. 11, a display 1101 of an electronic device may display graphic objects 1111 and 1112 for a category. When detecting an event occurring in an IoT device, the electronic device may update or generate a graphic object 1110 for a category into which a detected event is classified.

The electronic device may display the graphic object 1110 for the classified category and another graphic object for another category, based on a priority of each category, on a display 1102. The graphic object 1110 for the category into which the detected event is classified is assumed to be displayed on the right side. In this case, the electronic device may indicate that the graphic object 1110 is updated or generated according to event detection by adding an animation effect to the graphic objects 1110.

Specifically, when displaying a graphic object for the category into which the detected event is classified, the electronic device may gradually increase a size of the graphic object for the classified category from the size that is less than a size of a graphic object for another category to the same size as the size of the graphic object for the other category. For example, when displaying the graphic object 1110 for the classified category, the electronic device may first generate the graphic object 1110 for the classified category on the display 1102, in which the size of the graphic object 1110 for the classified category is less than the size of the graphic objects 1111 and 1112 for the other categories. Then, the electronic device may gradually increase the size of the graphic object 1110 for the classified category to the same size as the graphic categories 1111 and 1112 for the other categories on the display 1103. Then, the electronic device may display the graphic object 1110 on the right side of the display 1104 and the graphic object 1111 on the left side of the display 1104.

Figure 12:
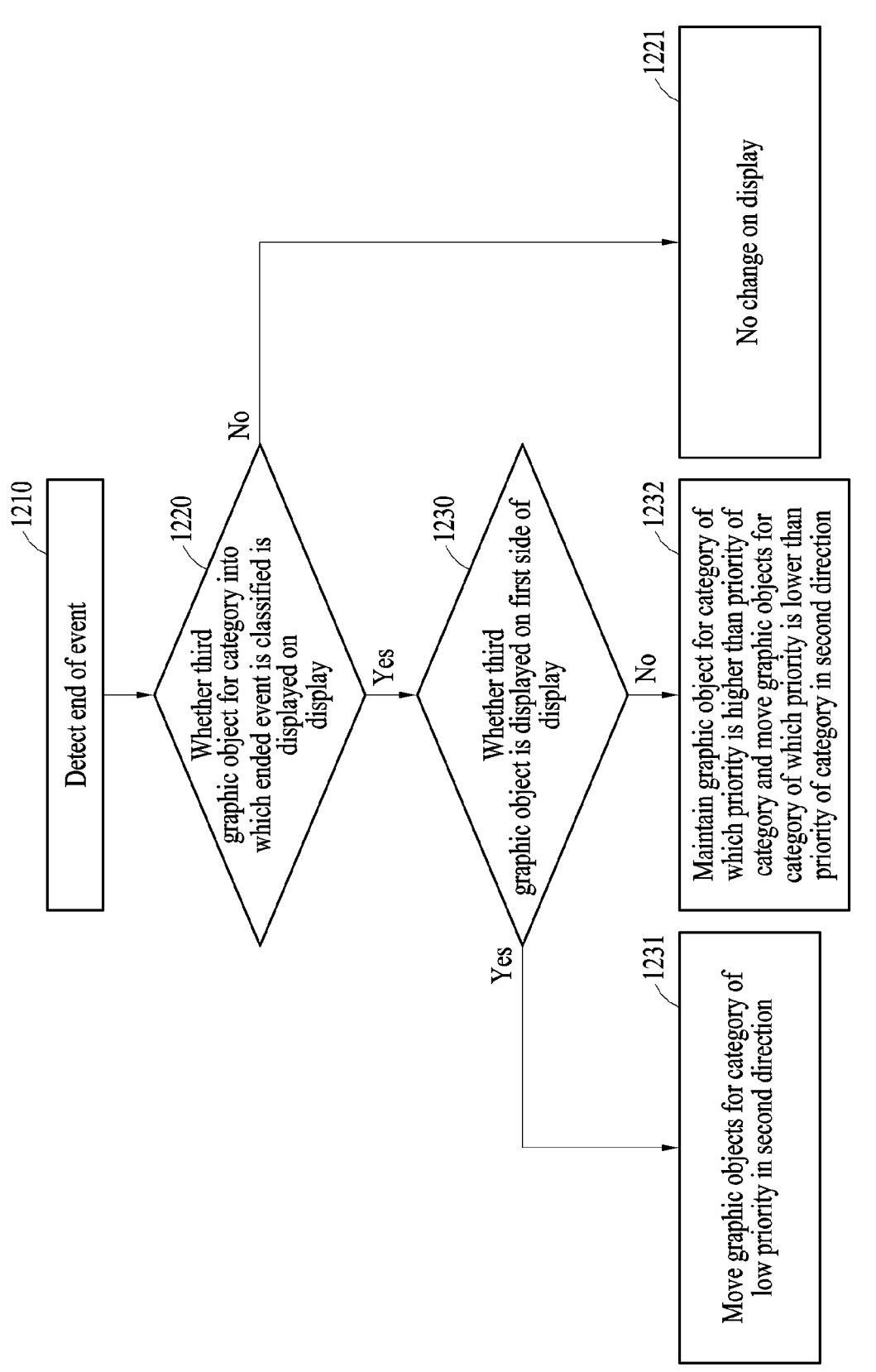
FIG. 12 is a flowchart illustrating a change of a graphic object displayed on a display when an end of an event is detected by the electronic device according to an embodiment.

FIG. 12 is a flowchart illustrating a change of a graphic object displayed on a display when an end of an event is detected by the electronic device according to an embodiment.

In operation 1210, the electronic device may detect an end of an event from at least one IoT device.

According to an embodiment, the electronic device may delete or update a third graphic object for a category into which an event is classified in response to detecting the end of the event from the at least one IoT device. The electronic device may delete the third graphic object when there is no event pending in a category into which the ended event is classified. The electronic device may update the third graphic object when there is an event pending in the category into which the ended event is classified. For example, the electronic device may change information on the number of events pending in the category and update the third graphic object.

In operation 1220, the electronic device may determine whether the third graphic object for the category into which the ended event is classified is displayed on the display.

In operation 1221, the electronic device may not change the graphic object displayed on the display when the third graphic object is not displayed on the display.

In operation 1230, the electronic device may determine whether the third graphic object is displayed on a first side of the display when the third graphic object is not displayed on the display.

In operation 1231, the electronic device may need to change the positions of all graphic objects displayed on the display when the third graphic object is displayed on the first side of the display. The electronic device may delete the third graphic object from the electronic device such that the third graphic object may not be displayed on the display.

The electronic device may move graphic objects in which a priority of a category is lower than a priority of the category corresponding to the third graphic object in a second direction. In this case, the second direction may be a direction from the first side to the second side.

In operation 1232, the electronic device may not need to change the positions of all the graphic objects displayed on the display when the third graphic object is not displayed on the first side of the display. The electronic device may delete the third graphic object from the electronic device such that the third graphic object may not be displayed on the display. The electronic device may maintain a display of a graphic object for a category of which a priority is higher than the priority of the category into which the ended event is classified on the display. On the other hand, the electronic device may move graphic objects for categories of which priority is lower than the priority of the category into which the ended event is classified in the second direction.

Figure 13:
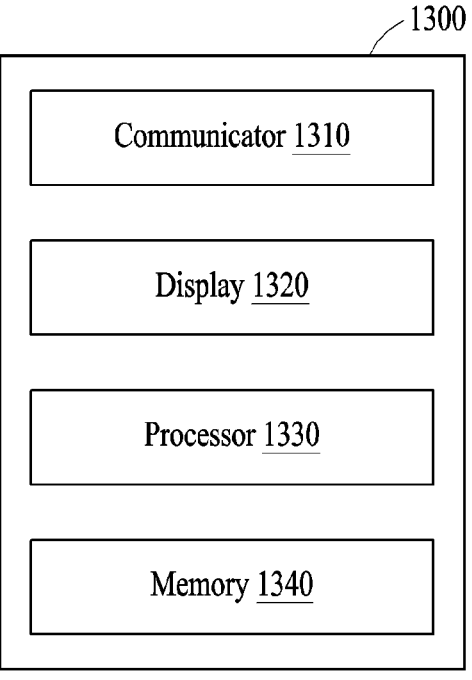
FIG. 13 is a block diagram illustrating a configuration of the electronic device according to an embodiment.

FIG. 13 is a block diagram illustrating a configuration of the electronic device according to an embodiment.

According to an embodiment, an electronic device 1300 may include a communicator 1310, a display 1320, a processor 1330, and a memory 1340. The communicator 1310 may establish a connection to at least one IoT device. The display 1320 may display a graphic object for an event and graphic objects for categories. The display 1320 may receive an input from a user and may process the received input. The input received by the display 1320 may include, for example, a touch input, a drag input, or a swipe input. However, a module for receiving and processing an input may not be limited to a display, and an input/output interface may be implemented in a separate module. The processor 1330 may receive information on an event from the at least one IoT device in response to detecting the event occurring in the at least one IoT device. In addition, the processor 1330 may update a graphic object for a category based on a merge between the detected event and another event according to a priority of each event in response to classifying the detected event into the category in which the other event previously occurring is pending among preset categories. In addition, the processor 1330 may display the graphic object for the classified category on a display based on a graphic object for another category and a priority of each category. In addition, the processor 1330 may perform the operations of the electronic device described above with reference to FIGS. 1 to 12. The memory 1340 may store information on events pending in the electronic device 1300.

The examples described herein may be implemented by using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An electronic device comprising:

a display;

a communicator configured to establish a connection to at least one Internet of Things (IoT) device;

memory storing instructions; and at least one processor comprising processing circuitry, wherein the instructions, when executed by the at least one processor individually or collectively, cause the electronic device to:

receive information on a first event detected by the at least one IoT device, classify the first event into a first category from among a plurality of preset categories, and based on identifying that the first event is among a plurality of pending events in the first category, wherein the plurality of pending events comprises a second event different from the first event:

identify a representative event of the first category having a highest priority among the first event and the second event, update a graphic object associated with the first category based on an arrangement of the first event and the second event according to a priority of the first event among the plurality of pending events in the first category, wherein the updated graphic object associated with the first category comprises a graphic object representing the representative event and a graphic object representing a number of events included in the first category in addition to the representative event, and display, on the display, the updated graphic object associated with the first category based on a priority of the first category among the plurality of preset categories, and user control configured to allow a user to search for graphic objects associated with categories among the plurality of preset categories for less than a threshold time.

2. The electronic device of claim 1, wherein the instructions, when executed by the at least one processor individually or collectively, cause the electronic device to:

based on identifying that the first event is the only pending event in the first category, generate a new graphic object associated with the first category using the received information on the first event and display the new graphic object associated with the first category on the display based on a graphic object associated with a category of the plurality of preset categories other than the first category and the priority of each category of the plurality of preset categories.

3. The electronic device of claim 1, wherein the instructions, when executed by the at least one processor individually or collectively, cause the electronic device to:

based on a user interacting with the graphic object associated with the first category, provide the user with information on the plurality of pending events in the first category according to the priority of each pending event among the plurality of pending events in the first category.

4. The electronic device of claim 1, wherein each respective category of the plurality of preset categories is associated with a different basis for prioritizing pending events within the respective category.

5. The electronic device of claim 1, wherein the plurality of preset categories further comprises a second category and a third category, wherein in the first category pending events are prioritized based on an event remaining time, wherein in the second category pending events are prioritized based on an event occurrence target, and wherein in the third category pending events are prioritized based on an event occurrence order.

6. The electronic device of claim 1, wherein among the plurality of preset categories, the priority of each preset category of the plurality of preset categories is set according to a function corresponding to each of the plurality of preset categories of the plurality of preset categories, and wherein the instructions, when executed by the at least one processor individually or collectively, cause the electronic device to classify the first event into the first category based on a function indicated by the first event.

7. The electronic device of claim 1, wherein the instructions, when executed by the at least one processor individually or collectively, cause the electronic device to:

display, on the display, a graphic object associated with a second category among the plurality of preset categories on a first side, wherein the second category has a priority higher than the priority of the first category, and display, on the display, the updated graphic object associated with the first category on a second side that is opposite to the first side relative to a center of the display.

8. The electronic device of claim 7, wherein the instructions, when executed by the at least one processor individually or collectively, cause the electronic device to:

scroll graphic objects to display the graphic object associated with the second category on the first side when the graphic object associated with the second category is not displayed on the first side.

9. The electronic device of claim 7, wherein the instructions, when executed by the at least one processor individually or collectively, cause the electronic device to:

display, on the display, a graphic object associated with a third category among the plurality of preset categories on a second side, wherein the third category has a priority that is lower than the priority of the first category, and display, on the display, the updated graphic object associated with the first category on the first side that is opposite to the second side relative to the center of the display.

10. The electronic device of claim 1, wherein the instructions, when executed by the at least one processor individually or collectively, cause the electronic device to:

display a scroll bar on the display configured to allow a user to search for a graphic object associated with a category among the plurality of preset categories for less than or equal to a threshold time, and end the display of the scroll bar when the threshold time elapses and the updated graphic object associated with the first category is displayed on the display.

11. The electronic device of claim 1, wherein the instructions, when executed by the at least one processor individually or collectively, cause the electronic device to:

repeat an operation of moving all graphic objects associated with categories among the plurality of preset categories displayed on the display closer to an edge of the display and moving all graphic objects associated with categories among the plurality of preset categories farther from the edge of the display for a predetermined number of times based on an edge of the display adjacent to a position of the updated graphic object associated with the first category on the display.

12. The electronic device of claim 1, wherein the instructions, when executed by the at least one processor individually or collectively, cause the electronic device to:

increase a size of the updated graphic object associated with the first category from a size that is less than a size of a graphic object associated with another category among the plurality of preset categories to a size that is equal to the size of the graphic object associated with the other category among the plurality of preset categories.

13. The electronic device of claim 1, wherein the instructions, when executed by the at least one processor individually or collectively, cause the electronic device to:

receive information on a third event detected by the at least one IoT device, classify the third event into a second category from among the plurality of preset categories, and delete or update a graphic object associated with the second category.

14. A method performed by an electronic device, the method comprising:

receiving information on a first event detected by at least one Internet of Things device;

classifying the first event into a first category from among a plurality of preset categories; and based on identifying that the first event is among a plurality of pending events in the first category, wherein the plurality of pending events comprises a second event different from the first event:

identify a representative event of the first category having a highest priority among the first event and the second event;

updating a graphic object associated with the first category based on an arrangement of the first event and the second event according to a priority of the first event among the plurality of pending events in the first category, wherein the updated graphic object associated with the first category comprises a graphic object representing the representative event and a graphic object representing a number of events included in the first category in addition to the representative event; and displaying, on a display of the electronic device, the updated graphic object associated with the first category based on a priority of the first category among the plurality of preset categories, and user control configured to allow a user to search for graphic objects associated with categories among the plurality of preset categories for less than a threshold time.

15. The method of claim 14, further comprising:

based on identifying that the first event is the only pending event in the first category, generating a new graphic object associated with the first category using the received information on the first event and displaying the new graphic object associated with the first category on the display based on a graphic object for a category among the plurality of preset categories other than the first category and the priority of each category of the plurality of preset categories.

16. The method of claim 14, wherein the displaying, on the display, further comprises:

displaying, on the display, a graphic object associated with a second category among the plurality of preset categories on a first side, wherein the second category has a priority higher than the priority of the first category; and displaying, on the display, the updated graphic object for the first category on a second side that is opposite to the first side relative to a center of the display.

17. The method of claim 16, wherein the displaying, on the display, further comprises:

scrolling graphic objects to display the graphic object associated with the second category on the first side when the graphic object associated with a second category is not displayed on the first side.

18. The method of claim 16, wherein the displaying, on the display, further comprises:

displaying, on the display, a graphic object for a third category among the plurality of preset categories on a second side, wherein the third category has a priority that is lower than the priority of the first category; and displaying, on the display, the updated graphic object for the first category on the first side that is opposite to the second side relative to the center of the display.

19. A non-transitory computer readable medium having instructions stored therein, which when executed by at least one processor cause the at least one processor to execute a method of operating an electronic device, the method comprising:

receiving information on a first event detected by at least one Internet of Things device;

classifying the first event into a first category from among a plurality of preset categories; and identifying that the first event is among a plurality of pending events in the first category, wherein the plurality of pending events comprises a second event different from the first event:

identify a representative event of the first category having a highest priority among the first event and the second event;

updating a graphic object associated with the first category based on an arrangement of the first event and the second event according to a priority of the first event among the plurality of pending events in the first category, wherein the updated graphic object associated with the first category comprises a graphic object representing the representative event and a graphic object representing a number of events included in the first category in addition to the representative event; and displaying, on a display of the electronic device, the updated graphic object associated with the first category based on a priority of the first category among the plurality of preset categories, and user control configured to allow a user to search for graphic objects associated with categories among the plurality of preset categories for less than a threshold time.

20. An electronic device comprising:

a display;

a communicator configured to establish a connection to at least one Internet of Things (IoT) device;

memory storing instructions; and at least one processor comprising circuity, wherein the instructions, when executed by the at least one processor individually or collectively, cause the electronic device to:

receive information from the at least one IoT device on a first event detected by the at least one IoT device, classify the first event into a first category from among a plurality of preset categories, based on identifying that the first event is among a plurality of pending events in the first category, wherein the plurality of pending events comprises a second event different from the first event, update a graphic object associated with the first category based on an arrangement of the first event and the second event according to a priority of the first event among the plurality of pending events in the first category, wherein the updated graphic object associated with the first category comprises a graphic object representing the representative event and a graphic object representing a number of events included in the first category in addition to the representative event, based on identifying that the first event is the only pending event in the first category, generate a new graphic object associated with the first category, and display, on the display, either the updated graphic object or the new graphic object based on a graphic object associated with a category of the plurality of preset categories other than the first category and a priority of each category of the plurality of preset categories, and user control configured to allow a user to search for graphic objects associated with categories among the plurality of preset categories for less than a threshold time.

\* \* \* \* \*